US008923247B2

(12) United States Patent
Keller et al.

(10) Patent No.: US 8,923,247 B2
(45) Date of Patent: Dec. 30, 2014

(54) HANDOVER FROM CIRCUIT SWITCHED TO PACKET SWITCHED (75) Inventors: Ralf Keller, Würselen (DE); Magnus Hallenstål, Täby (SE); Magnus Olsson, Stockholm (SE); Fredrik Lindholm, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 233 days.

(21) Appl. No.: 13/577,874

(22) PCT Filed: Feb. 12, 2010

(86) PCT No.: PCT/EP2010/051800
§ 371 (c)(1),
(2), (4) Date: Sep. 27, 2012

(87) PCT Pub. No.: WO2011/098137
PCT Pub. Date: Aug. 18, 2011

(65) Prior Publication Data
US 2013/0016698 A1 Jan. 17, 2013

(51) Int. Cl.
*H04W 4/00* (2009.01)
*H04W 36/14* (2009.01)
*H04W 36/00* (2009.01)
*H04W 36/38* (2009.01)

(52) U.S. Cl.
CPC .......... *H04W 36/14* (2013.01); *H04W 36/0022* (2013.01); *H04W 36/385* (2013.01)
USPC ........................................ 370/331

(58) Field of Classification Search
USPC ......... 370/331, 352, 328, 254, 332, 357, 401; 455/435.1, 436, 439, 450; 709/228
See application file for complete search history.

(56) References Cited

U.S. PATENT DOCUMENTS

| 8,340,627 | B2* | 12/2012 | Edge .......................... 455/404.1 |
| 2009/0080382 | A1 | 3/2009 | Chen et al. |
| 2011/0274090 | A1* | 11/2011 | Hallensal et al. ............. 370/331 |
| 2013/0016698 | A1* | 1/2013 | Keller et al. .................. 370/331 |
| 2013/0195076 | A1* | 8/2013 | Keller et al. .................. 370/331 |
| 2013/0196665 | A1* | 8/2013 | Tiwari ........................... 455/436 |

FOREIGN PATENT DOCUMENTS

WO 2008148430 A1 12/2008

OTHER PUBLICATIONS

3rd Generation Partnership Project; "Technical Specification Group Services and System Aspects; 3GPP System Architecture Evolution: Report on Technical Options and Conclusions (Release 8)." 3GPP TR 23.882 V8.0.0. Sep. 2008. 3GPP, Sophia-Antipolis, France.

* cited by examiner

Primary Examiner — Phuongchau Ba Nguyen
(74) Attorney, Agent, or Firm — Coats and Bennett, PLLC (57) ABSTRACT The invention relates to a method for handing over a call of a mobile entity that is circuit switched attached via a Mobile Switching Center MSC (120) to an IP Multimedia Subsystem IMS, wherein the mobile entity (100) is registered at the IMS. According to the invention, either the MSC or a media gateway act as application function towards a PCRF with the correct IP address of the media gateway.

10 Claims, 6 Drawing Sheets

HANDOVER FROM CIRCUIT SWITCHED TO PACKET SWITCHED

TECHNICAL FIELD

The present invention relates to a method for handing over a call of a mobile entity that is circuit switched attached via a mobile switching center MSC to an IP multimedia subsystem (IMS). The invention furthermore relates to the mobile switching center MSC controlling the call, to a media gateway handling the call and to a method for operating a source SGSN.

BACKGROUND

Mobile networks are currently evolving from pure circuit switched (CS) networks towards IP based networks, and by that integrate into IP based infrastructures that are also used for the Internet, the World Wide Web and the datacom industry.

With this trend mobile networks follow the evolution steps of the wireline networks, where VoIP (Voice over IP) via DSL access or via WLAN access is existing technology today.

Mobile operators that install IMS (IP Multimedia Subsystem) networks and offer IMS services want to make these services available also to their subscribers when using GERAN/UTRAN access. Hereto, calls from and to this group of subscribers are routed through the IMS network in order for the IMS service engine to execute the call and call related services. This concept is called IMS Centralized Services (ICS). The IMS centralized Services work item in 3GPP targets at using the CS access for access to IMS services, see 3GPP TS 23.292, and is complemented by IMS Service Continuity, see 3GPP TS 23.237.

In parallel to the ICS trend the packet core is evolving (Evolved Packet Core, EPC) as part of the Evolved Packet System (EPS, which is Evolved Packet Core+E-UTRAN), supporting eUTRAN as new radio access network. As part of this discussion, single radio voice call continuity (SRVCC) has been specified and is further evolved in 3GPP SA2 (see 3GPP TS 23.216), enabling inter domain Handover (HO) of an IMS voice call from Packet Switched (PS) domain to Circuit Switched (CS) domain and vice versa. In Rel-9, SRVCC is combined with ICS for an IMS centralized solution supporting also SRVCC from eUTRAN/PS UTRAN to CS UTRAN/GERAN.

The current SRVCC procedures do not allow having an access transfer from circuit switched to packet switched, (LTE (Long Term Evolution) or HSPA (High Speed Packet Access)) also called "return direction for SRVCC". The only specified solution is from packet switched to circuit switched here especially from GERAN/UTRAN switched and here especially from GERAN/UTRAN to eUTRAN and from GERAN/UTRAN to HSPA.

SUMMARY

Accordingly, a need exists to allow an access transfer from a circuit switched attachment of a mobile entity to the IMS to a packet switched attachment to the IMS.

This need is met by the features of the independent claims. In the dependent claims preferred embodiments of the invention are described.

According to a first aspect of the invention, a method for handing over a call of a mobile entity that is circuit switched attached via the MSC to an IP multimedia subsystem IMS is provided, wherein the mobile entity is registered at the IMS. The method comprises the step of receiving, by the MSC, a handover request message for handing over the call from the circuit switched attachment to the IMS to a packet switched attachment to the IMS. According to another step of the invention, the MSC transmits to a source SGSN (Serving GPRS Support Node) in a visited network to which said mobile entity is currently connected to, a first handover command to switch from the circuit switched to the packet switched attachment to the IMS in response to said handover request message. Additionally, the MSC transmits a second handover command to the mobile entity instructing a handover from the circuit switched to the packet switched attachment. Furthermore, the MSC instructs a media gateway to transmit media data on a bearer provided for said packet switched attachment. According to the invention, the MSC that is handling the call before the handover also handles the call after the handover. The functionality for this is provided in the visited network and it is not necessary to use a signalling back to the home network of the mobile entity. The handover request message can be received from a BSC (Base Station Controller), RNC (Radio Network Controller) or from a radio access, and the mobile entity may be registered at the IMS over the packet switched network/access. The media gateway instructed by the MSC to transmit media data is preferably the media gateway which typically handles the media plane when using the circuit switched access to the IMS.

According to a preferred embodiment of the invention, the MSC informs a policy and charging rules function PCRF which initiates a bearer establishment for said call handed over, of an address of said media gateway that is controlling the bearer provided for said packet switched attachment. According to this embodiment, the MSC acts as application function towards the PCRF. The application function is the unit that provides to the PCRF the information needed for the handover, e.g. the address, the correct IP address, of the media gateway. Optionally, the MSC may inform the PCRF using the media gateway which then acts as application function for the PCRF. A further option for transmitting the first handover command to the PCRF is that the MSC interacts with a P-CSCF (Proxy Call Service Control Function) of the IMS, which then communicates with the PCRF for the bearer establishment.

Furthermore, the method may comprise the step of receiving a handover command response from the source SGSN indicating resources allocated for said packet switched attachment. Additionally, a handover command response can comprise EPS context information (e.g. radio bearer used in E-UTRAN).

In one embodiment of the invention the handover request message received from the radio access/BSC/RNC includes the information that the handover is a single radio voice call continuity handover (SRVCC handover). Thus, in this embodiment the handover request message indicates that the handover is for SRVCC. This indication is included when a quality bearer with specific quality requirements is provided directly after handover or in a session transfer on LTE/HSPA.

Preferably, the second handover command to the mobile entity may contain at least one of the following information: an IP address of the media gateway used for the packet switched attachment, address of the media gateway used for the packet switched attachment, ports of the media gateway used for said bearer, a speech codec used, an address of a visited session transfer function V-STF provided in an MSC in the visited network. This additional IMS context information may be needed by the mobile entity before it starts tuning on a target radio access network RAN and starts sending RTP packages.

In one embodiment of the invention the bearer is a quality bearer meeting specified quality requirements directly after handover. In another embodiment the bearer is a best effort bearer first, wherein a quality bearer with specified quality requirements for said call is set up after the handover command is transmitted to the mobile entity.

According to one embodiment of the invention, the method further comprises the step of receiving a SIP INVITE message from the mobile entity instructing the visited session transfer function V STF provided in the MSC to perform a session transfer from the circuit switched attachment to the packet switched attachment. In the present context the session transfer means that the MSC instructs the media gateway to send/receive on the packet switched bearer instead of sending/receiving on the circuit switched bearer. This SIP INVITE message initiates the movement of the call control from the MSC to the mobile entity.

The call is preferably anchored in the visited session transfer function V-STF provided in the MSC during the circuit switched and the packet switched attachment to the IMS. Thus, it is not necessary to route signalling messages to the home network of the mobile entity, as the session transfer function is provided in the visited network and is therefore called visited session transfer function V-STF in the present case.

The MSC may furthermore receive a confirmation message from the PCRF informing the MSC that a bearer has been established. In this step the PCRF returns confirmation to the application function provided by the MSC. If the application function is provided by the media gateway, the confirmation is returned to the media gateway. If the PCRF received the information from the P-CSCF, the confirmation is returned via the P-CSCF.

The invention furthermore relates to the mobile switching center controlling the call of the mobile entity in a call situation as mentioned above in which the call is circuit switched attached to the IMS, the IMS and the mobile entity being located in a visited network. According to the invention, the MSC comprises the visited session transfer function V-STF configured to receive the handover request message for handing over the call from the circuit switched attachment to the packet switched attachment to the IMS. The V-STF is furthermore configured to transmit to the source SGSN in the visited network, to which said mobile entity is currently connected, a first handover command to switch the circuit switched attachment to the packet switched attachment in response to said handover request message. Thus, the V-STF controls the transfer from circuit switched to packet switched and informs the SGSN of the handover using the circuit switched to packet switched handover command.

Preferably, the V-STF is configured to anchor the call when it is circuit switched and packet switched attached to the IMS.

The invention furthermore relates to media gateway handling the call of the mobile entity in the above discussed situation in which the media gateway comprises a media resource function processor MRFP anchoring the media plane for the packet switched attachment of the call to the IMS. The media gateway is configured to inform the PCRF to initiate the bearer establishment for said handed over call and to inform the PCRF of an address of the media gateway that is controlling a media plane for said packet switched attachment. The MRFP anchors the media plane that is then transmitted over the bearer.

In another aspect of the invention a method for operating a source SGSN is provided that receives from the MSC the first handover command for the call, to switch from the circuit switched attachment to the packet switched attachment to the IMS. The source SGSN transmits the handover command response to the MSC when information about resources in a target SGSN have been received. In this embodiment the SGSN receives the handover request and waits for a bearer confirmation until the acknowledgment is received from the target SGSN access.

BRIEF DESCRIPTION OF THE DRAWINGS

In the following, the invention will be explained in further detail with reference to the accompanying drawings, in which.

DETAILED DESCRIPTION OF THE DRAWINGS

Figure 1:
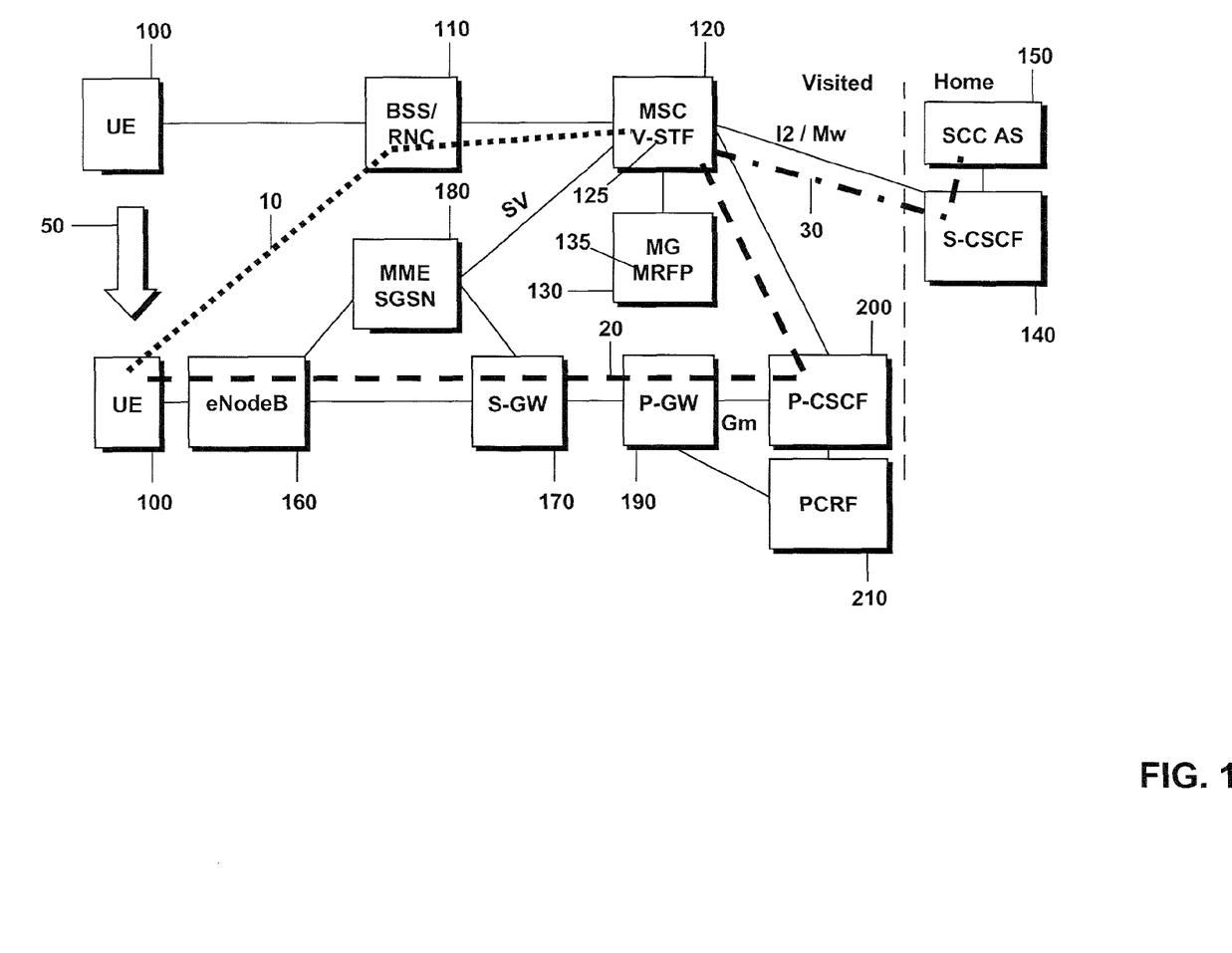
FIG. 1 shows a schematic view of the network components affected in a handover of a mobile entity related call from a circuit switched to a packet switched attachment to an IMS.

In FIG. 1 the overall architecture and functionality of a handover of a call that is circuit switched attached to an IMS, to a packet switched attachment to the IMS is shown. A mobile entity or user equipment (UE) 100 has a circuit switched access leg 10 to a BSS/RNC 110 (Base Station Subsystem or Radio Network Controller) that is connected to an MSC server 120. The MSC server 120 is in connection with the media gateway 130 that handles the media plane when using a circuit switched access to an IP multimedia subsystem provided in a home network. From the IMS, a SCSCF (Serving Call Session Control Function) 140 is shown connected to a SCCAS (Service Consistency and Continuity Application Server). Thus, before handover the mobile entity uses the access leg 10 to the MSC and the remote leg 30 from the MSC to the IMS. If an access transfer from circuit switched to packet switched is desired shown by leg 20 and, as indicated by the arrow 50, the following may happen:

The MSC comprises a visited session transfer function V-STF 125 that will control the handover from circuit switched to packet switched as will be explained in detail further below. After the handover the mobile entity 100 uses the packet switched access leg 20 to the MSC via an eNodeB 160, a serving gateway SGW 170, and a PDN gateway 190. The PDN gateway 190 communicates with a proxy control session function P-CSCF 200 which is a SIP proxy provided in the visited network and which is in connection with a PCRF (Policy and Charging Rule Function) 210. The V-STF 125 provided in the MSC 120 communicates with a SGSN 180 that is shown in the same node as an MME (Mobile Management Entity). In the media gateway 130 an MRFP (Media Resource Function Processor) is provided.

In the procedure for performing the access transfer from circuit switched to packet switched the mobile entity is registered at the IMS before a handover command from circuit switched to packet switched is generated. The MSC, using the V-STF 125 carries out the signalling to the source SGSN 180, i.e. the SGSN serving the GERAN/UTRAN cell, to inform about the SRVCC circuit switched to packet switched handover. Additionally, the IP address for signalling and the media on the packet switched attachment is determined and the media is moved from circuit switched to packet switched and a mobile entity control on LTE is re-established.

Figure 2:
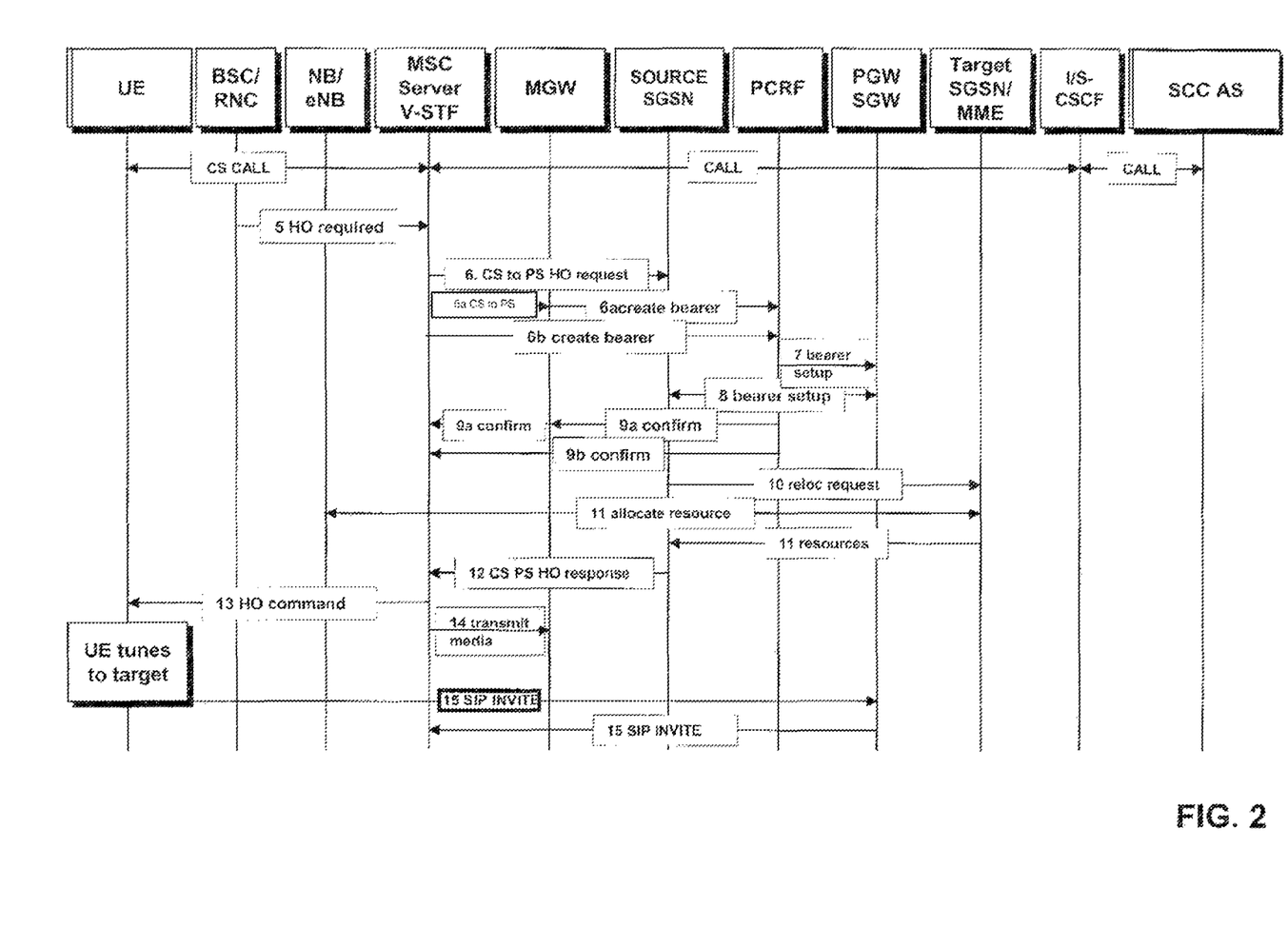
FIG. 2 shows the signalling between the different components in which either the MSC or the media gateway play the role of an application function towards a PCRF.

A more detailed view of the signalling is discussed in connection with FIG. 2 showing a first embodiment in which either the MSC 120 or the media gateway 130 plays the role of an application function towards the PCRF 210. In still another alternative not shown in FIG. 2 the MSC communicates via the P-CSCF 200 with the PCRF 210.

As described in connection with FIG. 1 the mobile entity 100 is circuit switched and packet switched attached and is registered within the IMS and therefore has its IP address. The IMS registration is performed over PS bearer. This PS bearer can be suspended in case a CS call is ongoing. Additionally, the mobile entity has indicated that it is SRVCC capable so that both the SGSN and the MSC know. The mobile entity has at least one bearer/PDF context (e.g. a default bearer). During idle mode mobility the MSCs may exchange V-STF context information, e.g. via the P-CSCF or via MSC-MSC context exchange. When the mobile entity is registering in the IMS, the mobile entity may also indicate default port and codec, it will receive media on when a transfer is performed.

The mobile entity 100 makes a circuit switched call and anchors the call in the SCC AS 150/V-STF 125. It should be noted that the V-STF 125 is kept for the time of the call, since the MSC plays the role of the anchored MSC. The call is started on an access that is not capable of supporting VoIP, otherwise the mobile entity would use VoIP.

A handover decision may be generated in GERAN/UTRAN based on measurement reports or based on a blind handover corresponding to a handover decision without signal strength measurements. This situation is shown by the circuit switched call from the UE to the SCC AS in FIG. 2. In step 5 the RNC (Radio Network Controller)/BSC (Base Station Controller) sends a handover required to the MSC 120. Since there are packet switched bearers, a handover is also required to SGSN 180. This handover request message sent to the MSC and to the SGSN includes an indication that the handover is for SRVCC. In reaction thereto the MSC sends a first handover command from circuit switched to packet switched to the source SGSN 180. In FIG. 2 a first embodiment is indicated with step 6A in which the MSC sends this command to the media gateway which then acts as application function towards the PCRF 210 with the correct IP address of the media gateway. In an alternative shown in step 6B, the MSC itself acts as application function towards the PCRF with the correct IP address of the media gateway.

In a third alternative, not shown in FIG. 2, the MSC interacts with the P-CSCF 200 which then communicates with the PCRF 210.

In step 7 the PCRF starts a bearer setup towards the PDN gateway 190. When the bearer setup reaches the source SGSN, the latter associates the new bearer with the handover circuit switched to packet switched that was previously received in step 6 (step 8). In step 9 the PCRF returns confirmation to the application function which may be a MSC in alternative 6b or the media gateway in alternative 6a mentioned above (step 9b and 9a, respectively). In the third alternative the PCRF returns it via the P-CSCF 200.

In step 10 the SGSN 180 sends a relocation request to the target SGSN/MME, the target allocating resources in UTRAN/eUTRAN and returns these resources to the source SGSN (step 11).

As can be seen from step 12 the source SGSN sends the handover circuit switched to packet switched response to the MSC including the allocated resource and EPS context information. If necessary, the SGSN sends the handover command to the BSC/RNC 110 as discussed in connection with step 5.

In step 13 the MSC sends the handover command, as second handover command, to the mobile entity indicating the circuit switched to packet switched handover. This may include additional IMS context information including the IP address and ports of the media gateway, the speech codec used and the address of the V-STF 125 provided in the MSC. In step 14 the MSC instructs the media gateway to transfer media and in step 15 the mobile entity tunes in on the target radio access network and starts sending RTP packages. Additionally, the mobile entity sends a SIP INVITE message to V-STF 125 to move the call control from the MSC to the mobile entity.

Source and target SGSN can be located in different nodes. However, source and target SGSN might be identical for the case GERAN/UTRAN to HSPA. Furthermore, SGSN and MME can be implemented in the same node as shown.

In this embodiment described above in connection with FIG. 2 the quality bearer is available directly after handover. Thus, the quality bearer is provided from the beginning of the bearer establishment. Here the MSC, or the media gateway plays the role of the application function towards the PCRF that is responsible for bearer setup and responsible for the quality of the bearer.

Figure 3:
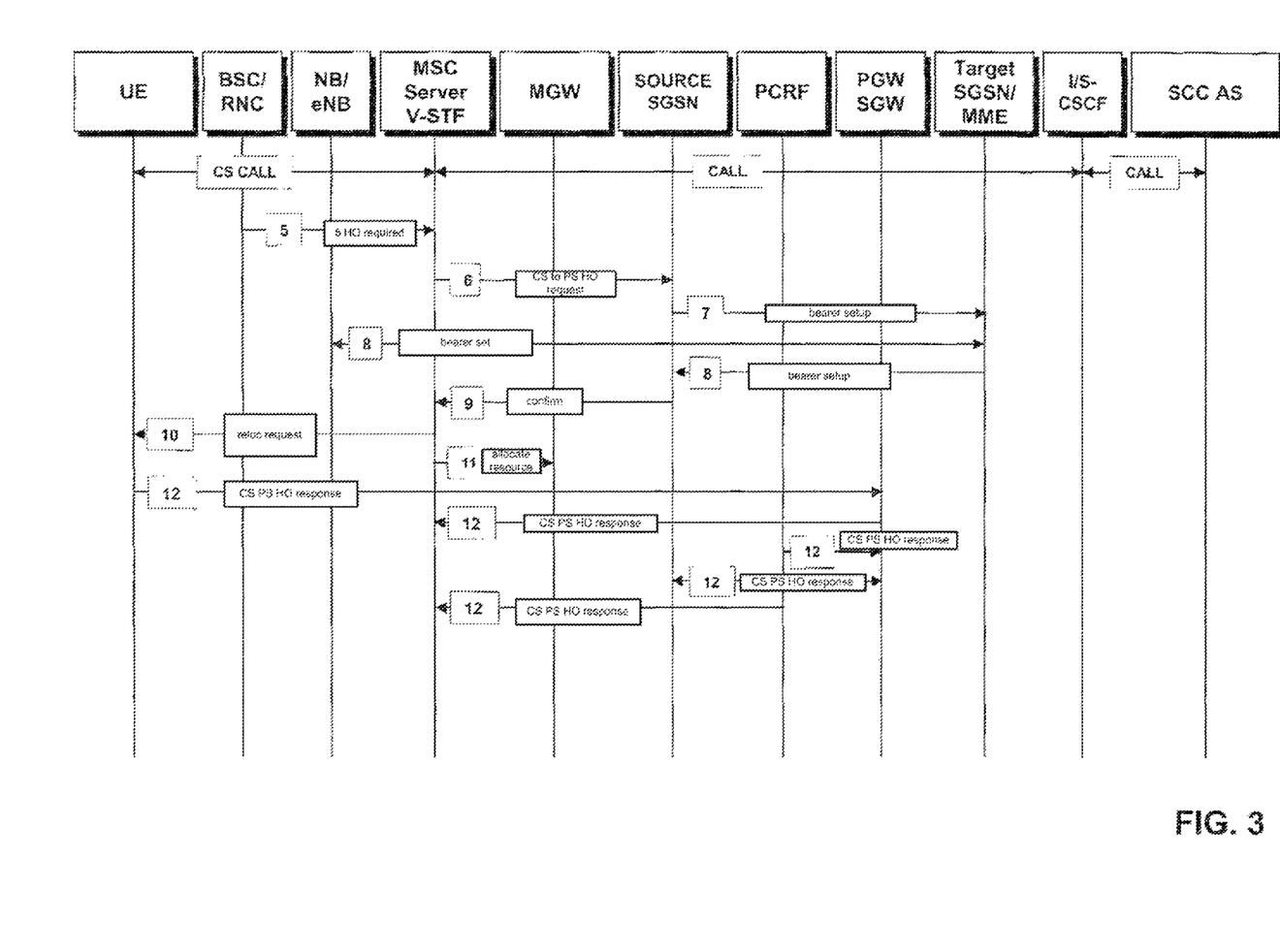
FIG. 3 shows the signalling for another embodiment to handover from circuit switched to packet switched in which the media is first sent on an existing best effort bearer before a bearer with specific quality requirements is established.

Another embodiment is shown in connection with FIG. 3 where after SRVCC the media is further sent on an existing best-effort bearer. Accordingly, there is no need to reserve voice over IP during SRVCC. After camping on the target radio access network, a voice over IP bearer is established.

Steps 1 to 5 correspond to steps 1 to 5 of FIG. 2.

In step 6 the MSC sends the first handover command from circuit switched to packet switched to the source SGSN. In step 7 the SGSN sends a relocation request to the target SGSN/MME including the existing bearers. The target SGSN allocates resources in UTRAN/eUTRAN and returns these resources to the source SGSN (step 8).

The source SGSN then sends the handover response from circuit switched to packet switched to the MSC including allocated resources and EPS context information (step 9). If necessary, see step 5, the SGSN sends a handover command to the BSC/RNC.

In step 10 the MSC sends a handover command to the mobile entity indicating the circuit switched to packet switched handover. This may include additional IMS context information of the IP address and ports of the media gateway and codec used. In step 11 the MSC instructs the media gateway to transfer media to the best-effort bearer that is already provided. In step 12 the mobile entity tunes the target radio access network and starts sending RTP packages on the best-effort bearer. It also sends a session transfer request, e.g. a SIP INVITE message, to V-STF to move the call control from MSC to the mobile entity. This step may trigger the PCRF interaction to allocate a speech bearer including the step of a bearer setup towards the PND gateway, the step of the SGSN associating the new bearer with the handover command, the PCRF returning confirmation to the MSC.

In this embodiment it is possible to have rules in the PCRF to treat this traffic towards the media gateway with high priority. When the embodiment of FIG. 3 is compared to the embodiment of FIG. 2 it can be seen that the quality bearer is not set up from the beginning, but that first a best-effort bearer is used and that a quality bearer is only set up in step 12.

Figure 4:
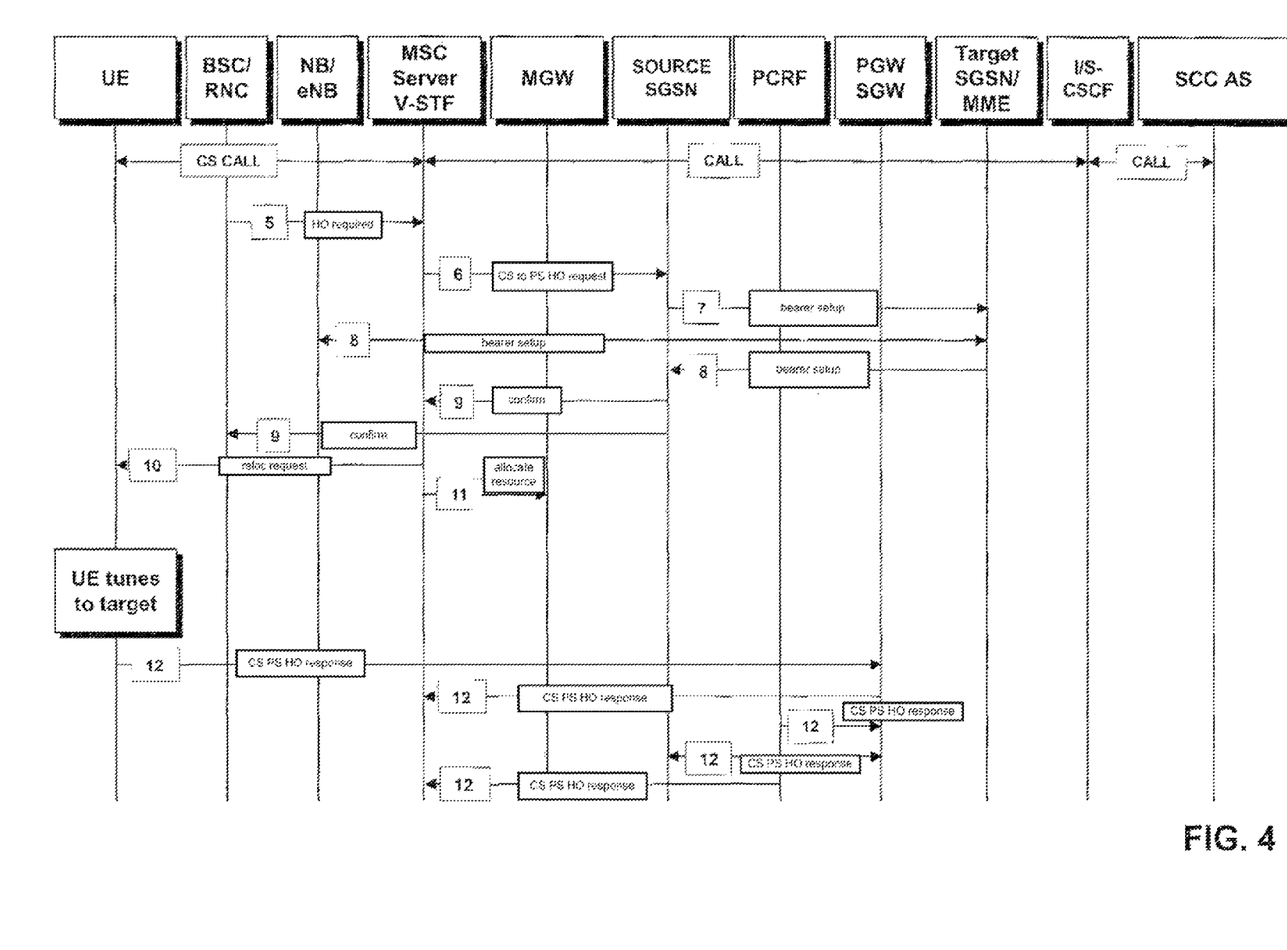
FIG. 4 shows the signalling between the components in an embodiment for a session transfer on LTE/ASPA.

In connection with FIG. 4 another embodiment is shown relating to session transfer on LTE/HSPA. The idea of this embodiment is to perform a handover from source to target for the existing bearer and to re-establish the voice media when camping on the target. Here steps 1 to 5 correspond to the embodiment shown in FIG. 2 with the exception that when the mobile entity is registering in the IMS, the mobile entity may not indicate a default port and codec. In step 6 the MSC sends the handover command from circuit switched to packet switched to the source SGSN, the source SGSN sending the relocation request to the target SGSN/MME, only for the existing packet switched bearers (step 7).

In step 8 the target SGSN allocates resources in UTRAN/eUTRAN and returns these resources to the source SGSN. In step 9 the source SGSN sends the handover circuit switched to packet switched response to the MSC. Additionally, the SGSN sends the handover command to the BSC/RNC indicating the circuit switched to packet switched handover. In step 10 the MSC sends the handover command to the mobile entity indicating the circuit switched to packet switched handover and in step 11 the MSC instructs the media gateway to transfer media on a best-effort bearer.

As can be seen from FIG. 4 the mobile entity tunes in on the target RAN and sends a SIP INVITE to the V-STF provided in the MSC server to perform a session transfer from circuit switched to packet switched and thereby to move the call control from the MSC to the mobile entity. This step furthermore triggers the PCRF interaction to allocate a speech bearer as indicated in steps 7 to 9 in connection with FIG. 2.

The mobile entity uses here an SR-STI (Single Radio Session Transfer Identifier—an identifier put into the SIP INVITE) that is configured on the mobile entity or that was received from the V-STF prior to the transfer. In another alternative, the SR-STI was received from the V-STF during the transfer, as part of the handover command in step 10. In this embodiment discussed in connection with FIG. 4 the quality bearer is provided after the session transfer on the LTE.

Figure 5:
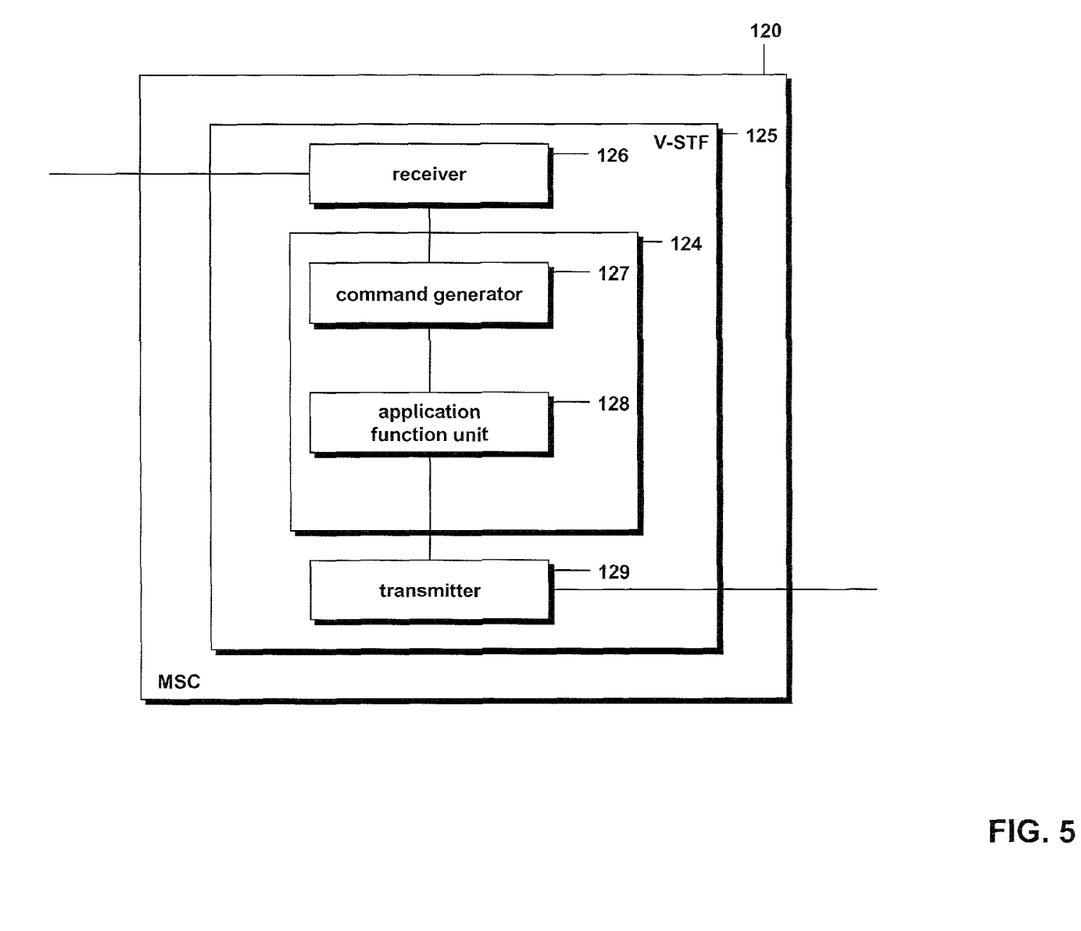
FIG. 5 shows a more detailed schematic view of the MSC shown in FIG. 1.

In FIG. 5 a more detailed view of the mobile switching center 120 is shown. As discussed in connection with FIG. 1 the MSC contains the V-STF 125 that is controlling the transfer from circuit switched to packet switched. The V-STF 125 receives the handover request message in a receiver 126 and comprises a processing unit 124 containing a command generator configured to generate the first handover command to switch from the circuit switched attachment to the packet switched attachment to the IMS. As discussed above in connection with FIGS. 2 and 3 the V-STF may take over the role of the application function for the PCRF. To this end, the V-STF 125 comprises an application function unit 128 responsible for the communication with the PCRF. The commands transmitted by the V-STF can be transmitted via the transmitter 129.

Figure 6:
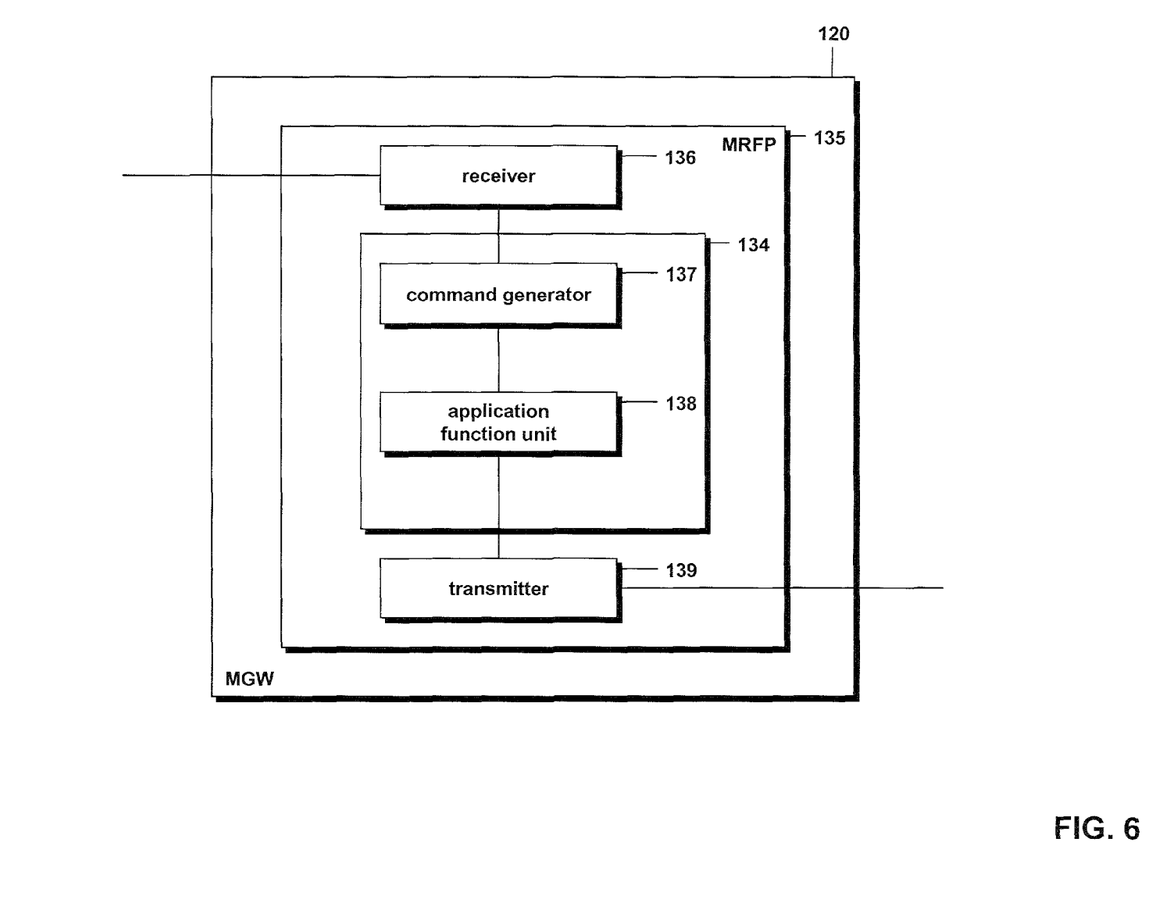
FIG. 6 shows a more detailed schematic view of the media gateway shown in FIG. 1.

In FIG. 6 the media gateway is shown in further detail. As discussed in connection with FIG. 1 the media gateway comprises the MRFP 135 comprising a receiver 136 where messages from other units or nodes are received. As discussed above the media gateway may also take over the role of the application function. To this end the MRFP comprises a processing unit 134 with a command generator 137 and an application function unit 138. The command generator may, by way of example, generate the handover command to switch from circuit switched to packet switched. The MRFP controls the use of the resources of the media gateway, and any command generated by the MRFP may be transmitted via the transmitter 139. The units shown in the Figs. are only schematically shown with subunits that are necessary for the understanding of the present invention. As it is clear to one skilled in the art, the different nodes have additional tasks and units which were however omitted for the sake of clarity. The different subunits shown in FIGS. 5 and 6 may be provided combined in subunits. Furthermore, the different units may be incorporated by hardware or software or a combination of hardware and software.

The invention claimed is:

1. A method for handing over a call of a mobile entity that is circuit switched attached via a mobile switching center located in a visited network to an IP multimedia subsystem, wherein the mobile entity is registered at the IP multimedia subsystem, the method comprising:

receiving, by the mobile switching center, a hand over request message from a radio access for handing over the call from the circuit switched attachment to the IP multimedia subsystem to a packet switched attachment to the IP multimedia subsystem, wherein the hand over request message includes an information that the hand over is a single radio voice call continuity hand over, the mobile switching center comprising a visited session transfer function that controls the hand over from circuit switched to packet switched, transmitting, by the mobile switching center, to a source servicing GPRS support node in a visited network to which said mobile entity is currently connected to, a first hand over command to switch from the circuit switched to the packet switched attachment to the IP multimedia subsystem, in response to said hand over request message, transmitting, by the mobile switching center, a second hand over command to the mobile entity instructing a hand over from the circuit switched to the packet switched attachment, and instructing, by the mobile switching center, a media gateway to transmit media data on a bearer provided for said packet switched attachment, wherein the call is anchored in a visited session transfer function provided in the mobile switching center during the circuit switched and the packet switched attachment to the IP multimedia subsystem without routing signalling messages to the home network of the mobile entity.

2. The method according to claim 1, wherein the mobile switching center informs a policy and charging rules function which initiates a bearer establishment for said call handed over, of an address of said media gateway that is controlling the bearer provided for said packet switched attachment.

3. The method according to claim 1, further comprising receiving a hand over command response from the source servicing GPRS support node indicating resources allocated for said packet switched attachment.

4. The method according to claim 1, wherein the second hand over command to the mobile entity contains at least one of the following information: an IP address of the media gateway used for the packet switched attachment; ports of the media gateway used for said bearer; a speech codec used; and an address of a visited session transfer function provided in the mobile switching center in the visited network.

5. The method according to claim 1, wherein the bearer is a best effort bearer, wherein a quality bearer meeting specified quality requirements of said call is set up after the hand over command is transmitted to the mobile entity.

6. The method according to claim 1, wherein said bearer is a quality bearer with specified quality requirements for said call, wherein said quality bearer is provided before the hand over command is transmitted to the mobile entity.

7. The method according to claim 1, further comprising receiving a SIP invite message from the mobile entity instructing a visited session transfer function provided in the mobile switching center to perform a session transfer from the circuit switched attachment to the packet switched attachment.

8. The method according to claim 2, further comprising receiving a confirmation message from the policy and charging rules function informing the mobile switching center that a bearer has been established.

9. The method according to claim 1, wherein the media gateway is the media gateway that handles a media plane of said call, when using the circuit switched areas to the IP multimedia subsystem.

10. A mobile switching center controlling a call of a mobile entity that is circuit switched attached to an IP multimedia subsystem, wherein the mobile switching center and the mobile entity are located in a visited network, the mobile switching center comprising a visited session transfer function that controls a hand over from circuit switched to packet switched, the mobile switching center being configured to receive a hand over request message from a radio access for handing over the call from the circuit switched attachment to the IP multimedia subsystem to a packet switched attachment to the IP multimedia subsystem, wherein the hand over request message includes an information that the hand over is a single radio voice call continuity handover, the mobile switching center being configured to transmit to a source servicing GPRS support node in the visited network to which said mobile entity is currently connected to, a first hand over command to switch the circuit switched attachment to the packet switched attachment to the IP multimedia subsystem, in response to said request message, wherein the visited session transfer function is configured to anchor the call when it is circuit switched attached to the IP multimedia subsystem and when it is packet switched attached to the IP multimedia subsystem without routing signalling messages to the home network of the mobile entity.

* * * * *